(12) United States Patent
Liu

(10) Patent No.: US 11,310,807 B2
(45) Date of Patent: Apr. 19, 2022

(54) RESOURCE ALLOCATION METHOD, NETWORK DEVICE, AND COMMUNICATIONS DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/649,129

(22) PCT Filed: Feb. 6, 2018

(86) PCT No.: PCT/CN2018/075475
§ 371 (c)(1),
(2) Date: Mar. 19, 2020

(87) PCT Pub. No.: WO2019/061982
PCT Pub. Date: Apr. 4, 2019

(65) Prior Publication Data
US 2020/0296733 A1   Sep. 17, 2020

(30) Foreign Application Priority Data
Sep. 28, 2017   (WO) .............. PCT/CN2017/104018

(51) Int. Cl.
*H04W 72/08*  (2009.01)
*H04W 28/02*  (2009.01)
*H04W 28/22*  (2009.01)

(52) U.S. Cl.
CPC ..... *H04W 72/087* (2013.01); *H04W 28/0268* (2013.01); *H04W 28/22* (2013.01)

(58) Field of Classification Search
CPC . H04W 24/02; H04W 28/0268; H04W 28/18; H04W 28/22; H04W 72/087; H04W 76/14
See application file for complete search history.

(56) References Cited

U.S. PATENT DOCUMENTS

2005/0169171 A1*  8/2005  Cheng ................ H04L 47/2425
                                                    370/229
2011/0312331 A1   12/2011  Hakola et al.
(Continued)

FOREIGN PATENT DOCUMENTS

CN    101345996 A    1/2009
CN    102333315 A    1/2012
(Continued)

OTHER PUBLICATIONS

3GPP TSG RAN Meeting #75, Dubrovnik, Croatia, Mar. 6-9, 2017—WI template Dec. 2016 (RAN #75 adaptation3)—RP-170798 (revision of RP-170724)—Huawei, CATT, LG Electronics, HiSilicon, China Unicom, New WID on 3GPP V2X Phase 2 (5 pages).
(Continued)

*Primary Examiner* — Khoa Huynh
(74) *Attorney, Agent, or Firm* — Perkins Coie LLP

(57) ABSTRACT

Implementations of the present application relate to a resource allocation method, a network device and a communication device. The method comprises: determining a quality of service (QoS) attribute of a first terminal device; and allocating, according to the QoS attribute, a transmission resource to the first terminal device, the transmission resource being used by the first terminal device to send data to a second terminal device.

14 Claims, 2 Drawing Sheets

(56) References Cited

U.S. PATENT DOCUMENTS

| | | | | |
|---|---|---|---|---|
| 2013/0157679 A1* | 6/2013 | Van Phan | ............ | H04W 76/14 455/452.2 |
| 2016/0088643 A1 | 3/2016 | Guo | | |
| 2016/0323869 A1* | 11/2016 | Xu | .................... | H04W 72/0473 |

FOREIGN PATENT DOCUMENTS

| | | | |
|---|---|---|---|
| CN | 104144426 | A | 11/2014 |
| CN | 104754748 | A | 7/2015 |
| CN | 104811892 | A | 7/2015 |
| CN | 106165524 | A | 11/2016 |
| EP | 2996372 | A2 | 3/2016 |
| WO | 2014181175 | A1 | 11/2014 |
| WO | 2016119124 | A1 | 8/2016 |
| WO | 2016209197 | A1 | 12/2016 |
| WO | 2017135783 | A1 | 8/2017 |

OTHER PUBLICATIONS

International Search Report dated Jun. 5, 2018 of PCT/CN2017/104018.
International Search Report dated Jun. 5, 2018 of PCT/CN2018/075475.
EPO, Examination Report for European Patent Application No. 18860584.4, dated Apr. 16, 2021. 6 pages.
INAPI, First Office Action for Chilean Patent Application No. 202000706, dated Mar. 17, 2021. 14 pages with English translation.
IPA, Examination Report No. 1 for Australian Patent Application No. 2018339671, dated Mar. 4, 2021. 4 pages.
Supplementary International Search Report dated Dec. 18, 2019 of PCT/CN2018/075475 (6 pages).
CNIPA, First Office Action for Chinese Application No. 202010834215.9, dated Aug. 27, 2021. 13 pages with English translation.
IPA, Examination Report No. 2 for Australian application No. 2018339671, dated Sep. 1, 2021. 3 pages.
IPI, Examination Report for Indian Application No. 202017016397, dated Jul. 20, 2021. 7 pages with English translation.
JPO, Notice of Reasons for Refusal for Japanese Application No. 2020/514924, dated Jul. 13, 2021. 12 pages with English translation.
3GPP "Policy and charging control architecture (Release 14)" 3GPP TS 23.203 V14.4.0 (Jun. 2017). 5 pages.
Examination Report No. 3 for Australian Application No. 2018339671 dated Dec. 13, 2021. 3 pages.
Notification of Reason for Refusal for Korean Application No. 10-2020-7006859 dated Jan. 28, 2022. 17 pages with English translation.
Second Office Action for Chilean Application No. 202000706 dated Nov. 25, 2021. 11 page with English translation.
Second Office Action for Chinese Application No. 202010834215.9 dated Nov. 11, 2021. 10 pages with English translation.

* cited by examiner

RESOURCE ALLOCATION METHOD, NETWORK DEVICE, AND COMMUNICATIONS DEVICE

CROSS-REFERENCE TO RELATED APPLICATION

The present application is a U.S. National Phase Entry of International PCT Application No. PCT/CN2018/075475 filed on Feb. 6, 2018, which claims priority to PCT Patent Application No. PCT/CN2017/104018, filed with the Chinese Patent Office on Sep. 28, 2017 and entitled "RESOURCE ALLOCATION METHOD, NETWORK DEVICE, AND COMMUNICATIONS DEVICE", which is incorporated herein by reference in its entirety.

BACKGROUND

Technical Field

This application relates to the communications field, and in particular, to a resource allocation method, a network device, and a communications device.

Related Art

An Internet of Vehicles system is a sidelink (Sidelink, SL) transmission technology based on Long Term Evolution (long term evolution, LTE) device-to-device communication (device-to-device communication, D2D). Different from a manner in a conventional LTE system in which communication data is received or sent by using a base station, the Internet of Vehicles system uses a manner of direct communication between terminal devices, and therefore has higher spectrum efficiency and lower transmission latency.

In a version Rel-14 of the 3rd Generation Partnership Project (3rd Generation Partnership Project, 3GPP), an Internet of Vehicles technology (V2X) is standardized, and two transmission modes, a mode 3 and a mode 4, are defined. In the mode 3, a transmission resource of a vehicle terminal is allocated by a base station. The vehicle terminal sends data on a sidelink according to the resource allocated by the base station, and the base station may allocate, to the terminal, a resource for a single transmission or a resource for semi-static transmission. In the mode 4, a vehicle terminal uses a sensing-based (sensing) and reservation-based (reservation) transmission manner. The vehicle terminal obtains an available transmission resource set in a resource pool through sensing, and then randomly selects a resource from the set to transmit data. Because services in the Internet of Vehicles system have a periodicity feature, the vehicle terminal generally uses a semi-static transmission manner. That is, after selecting a transmission resource, the terminal continually uses the resource in a plurality of transmission cycles, thereby reducing resource re-selection and resource conflict probabilities.

In addition, a terminal device may transmit data through carrier aggregation (Carrier Aggregation, CA). To prevent the terminal device from abusing a carrier resource, it is necessary to properly restrict a carrier selection action of the terminal device. However, for the mode 3, a network device still cannot implement such restriction.

SUMMARY

This application provides a resource allocation method, a network device, and a communications device.

According to a first aspect, a resource allocation method is provided. The method includes: determining a quality of service (Quality of Service, QoS) attribute of a first terminal device; and allocating a transmission resource to the first terminal device according to the QoS attribute, where the transmission resource is used by the first terminal device to send data to a second terminal device.

With reference to the first aspect, in an implementation of the first aspect, the QoS attribute includes a data transmission rate and/or a reliability requirement of the first terminal device.

It should be understood that, the data transmission rate and/or the reliability requirement of the first terminal device may be specifically a data transmission rate and/or a reliability requirement of a target service of the first terminal device, where the target service is a service transmitted between the first terminal device and the second terminal device by using the transmission resource.

With reference to the first aspect and the foregoing implementation of the first aspect, in another implementation of the first aspect, the determining a QoS attribute of a first terminal device includes: receiving QoS attribute information sent by the first terminal device or a core-network network element; and determining the QoS attribute of the first terminal device according to the QoS attribute information.

With reference to the first aspect and the foregoing implementations of the first aspect, in another implementation of the first aspect, the QoS attribute information includes the data transmission rate and/or a packet loss rate of the first terminal device.

It should be understood that, the QoS attribute information may specifically include the data transmission rate and/or a packet loss rate of the target service.

With reference to the first aspect and the foregoing implementations of the first aspect, in another implementation of the first aspect, the QoS attribute information includes a target index; and the determining the QoS attribute of the first terminal device according to the QoS attribute information includes: determining, according to a correspondence between different QoS attributes and different indexes, that a QoS attribute corresponding to the target index is the QoS attribute of the first terminal device.

With reference to the first aspect and the foregoing implementations of the first aspect, in another implementation of the first aspect, the correspondence between different QoS attributes and different indexes is a correspondence between different data transmission rates and reliability requirements and different indexes; and the determining, according to a correspondence between different QoS attributes and different indexes, that a QoS attribute corresponding to the target index is the QoS attribute of the first terminal device includes: determining, according to the correspondence between different data transmission rates and reliability requirements and different indexes, that a data transmission rate and a reliability requirement corresponding to the target index is the QoS attribute of the first terminal device.

With reference to the first aspect and the foregoing implementations of the first aspect, in another implementation of the first aspect, the QoS attribute information includes at least one of a maximum value, a minimum value, and a value range, where the maximum value is a maximum value of the data transmission rate and/or the reliability requirement of the first terminal device, the minimum value is a minimum value of the data transmission rate and/or the reliability requirement of the first terminal device, and the value range is a value range of the data transmission rate and/or a value range of the reliability requirement of the first terminal device.

With reference to the first aspect and the foregoing implementations of the first aspect, in another implementation of the first aspect, the QoS attribute information includes at least one of a maximum value, a minimum value, and a value range, where the maximum value is a maximum value of a data transmission rate and/or a reliability requirement of a target service, the minimum value is a minimum value of the data transmission rate and/or the reliability requirement of the target service, the value range is a value range of the data transmission rate and/or a value range of the reliability requirement of the target service, and the target service is a service transmitted between the first terminal device and the second terminal device by using the transmission resource.

With reference to the first aspect and the foregoing implementations of the first aspect, in another implementation of the first aspect, before the receiving QoS attribute information sent by the first terminal device or a core-network network element, the method further includes: sending a preset value to the first terminal device or the core-network network element, where the QoS attribute information is used to indicate a magnitude relationship between the data transmission rate and/or the reliability requirement of the first terminal device and the preset value, and the magnitude relationship is one of the following relationships: the data transmission rate and/or the reliability requirement of the first terminal device is greater than the preset value, the data transmission rate and/or the reliability requirement of the first terminal device is less than the preset value, the data transmission rate and/or the reliability requirement of the first terminal device is greater than or equal to the preset value, and the data transmission rate and/or the reliability requirement of the first terminal device is less than or equal to the preset value.

With reference to the first aspect and the foregoing implementations of the first aspect, in another implementation of the first aspect, before the receiving QoS attribute information sent by the first terminal device or a core-network network element, the method further includes: sending a preset value to the first terminal device or the core-network network element, where the QoS attribute information is used to indicate a magnitude relationship between a data transmission rate and/or a reliability requirement of a target service and the preset value; the magnitude relationship is one of the following relationships: the data transmission rate and/or the reliability requirement of the target service is greater than the preset value, the data transmission rate and/or the reliability requirement of the target service is less than the preset value, the data transmission rate and/or the reliability requirement of the target service is greater than or equal to the preset value, and the data transmission rate and/or the reliability requirement of the target service is less than or equal to the preset value; and the target service is a service transmitted between the first terminal device and the second terminal device by using the transmission resource.

It should be understood that, the reliability requirement in this implementation of this application may be specifically a packet loss rate.

According to a second aspect, a resource allocation method is provided. The method includes: determining, by a core-network network element, QoS attribute information, where the QoS attribute information is used to indicate a QoS attribute of a first terminal device; and sending, by the core-network network element, the QoS attribute information to a network device, where the QoS attribute information is used by the network device to allocate a transmission resource to the first terminal device, and the transmission resource is used by the first terminal device to send data to a second terminal device.

With reference to the second aspect, in an implementation of the second aspect, the QoS attribute includes a data transmission rate and/or a reliability requirement of the first terminal device.

It should be understood that, the data transmission rate and/or the reliability requirement of the first terminal device may be specifically a data transmission rate and/or a reliability requirement of a target service of the first terminal device, where the target service is a service transmitted between the first terminal device and the second terminal device by using the transmission resource.

With reference to the second aspect and the foregoing implementations of the second aspect, in another implementation of the second aspect, the QoS attribute information includes the data transmission rate and/or a packet loss rate of the first terminal device.

It should be understood that, the QoS attribute information may specifically include the data transmission rate and/or the reliability requirement of the target service.

With reference to the second aspect and the foregoing implementations of the second aspect, in another implementation of the second aspect, the QoS attribute information includes a target index, and the target index corresponds to the QoS attribute of the first terminal device.

With reference to the second aspect and the foregoing implementations of the second aspect, in another implementation of the second aspect, the method further includes: sending a to-be-processed service to the first terminal device, so that the first terminal device uses the transmission resource to process the to-be-processed service.

With reference to the second aspect and the foregoing implementations of the second aspect, in another implementation of the second aspect, the QoS attribute information includes at least one of a maximum value, a minimum value, and a value range, where the maximum value is a maximum value of the data transmission rate and/or the reliability requirement of the first terminal device, the minimum value is a minimum value of the data transmission rate and/or the reliability requirement of the first terminal device, and the value range is a value range of the data transmission rate and/or a value range of the reliability requirement of the first terminal device.

With reference to the second aspect and the foregoing implementations of the second aspect, in another implementation of the second aspect, the QoS attribute information includes at least one of a maximum value, a minimum value, and a value range, where the maximum value is a maximum value of a data transmission rate and/or a reliability requirement of a target service, the minimum value is a minimum value of the data transmission rate and/or the reliability requirement of the target service, the value range is a value range of the data transmission rate and/or a value range of the reliability requirement of the target service, and the target service is a service transmitted between the first terminal device and the second terminal device by using the transmission resource.

With reference to the second aspect and the foregoing implementations of the second aspect, in another implementation of the second aspect, before the sending, by the core-network network element, the QoS attribute information to a network device, the method further includes:

receiving, by the core-network network element, a preset value sent by the network device, where the QoS attribute information is used to indicate a magnitude relationship between the data transmission rate and/or the reliability requirement of the first terminal device and the preset value, and the magnitude relationship is one of the following relationships: the data transmission rate and/or the reliability requirement of the first terminal device is greater than the preset value, the data transmission rate and/or the reliability requirement of the first terminal device is less than the preset value, the data transmission rate and/or the reliability requirement of the first terminal device is greater than or equal to the preset value, and the data transmission rate and/or the reliability requirement of the first terminal device is less than or equal to the preset value.

With reference to the second aspect and the foregoing implementations of the second aspect, in another implementation of the second aspect, before the sending, by the core-network network element, the QoS attribute information to a network device, the method further includes: receiving, by the core-network network element, a preset value sent by the network device, where the QoS attribute information is used to indicate a magnitude relationship between a data transmission rate and/or a reliability requirement of a target service and the preset value; the magnitude relationship is one of the following relationships: the data transmission rate and/or the reliability requirement of the target service is greater than the preset value, the data transmission rate and/or the reliability requirement of the target service is less than the preset value, the data transmission rate and/or the reliability requirement of the target service is greater than or equal to the preset value, and the data transmission rate and/or the reliability requirement of the target service is less than or equal to the preset value; and the target service is a service transmitted between the first terminal device and the second terminal device by using the transmission resource.

It should be understood that, the reliability requirement in this implementation of this application may be specifically a packet loss rate.

According to a third aspect, a resource allocation method is provided. The method includes: determining, by a first terminal device, QoS attribute information, where the QoS attribute information is used to indicate a QoS attribute of the first terminal device; sending, by the first terminal device, the QoS attribute information to a network device; receiving, by the first terminal device, a transmission resource determined by the network device according to the QoS attribute information; and using, by the first terminal device, the transmission resource to send data to a second terminal device.

With reference to the third aspect, in an implementation of the third aspect, the QoS attribute includes a data transmission rate and/or a reliability requirement of the first terminal device.

It should be understood that, the data transmission rate and/or the reliability requirement of the first terminal device may be specifically a data transmission rate and/or a reliability requirement of a target service of the first terminal device, where the target service is a service transmitted between the first terminal device and the second terminal device by using the transmission resource.

With reference to the third aspect and the foregoing implementation of the third aspect, in another implementation of the third aspect, the QoS attribute information includes the data transmission rate and/or a packet loss rate of the first terminal device.

It should be understood that, the QoS attribute information may specifically include the data transmission rate and/or the reliability requirement of the target service.

With reference to the third aspect and the foregoing implementations of the third aspect, in another implementation of the third aspect, the QoS attribute information includes a target index, and the target index corresponds to the QoS attribute of the first terminal device.

With reference to the third aspect and the foregoing implementations of the third aspect, in another implementation of the third aspect, the QoS attribute information includes at least one of a maximum value, a minimum value, and a value range, where the maximum value is a maximum value of the data transmission rate and/or the reliability requirement of the first terminal device, the minimum value is a minimum value of the data transmission rate and/or the reliability requirement of the first terminal device, and the value range is a value range of the data transmission rate and/or a value range of the reliability requirement of the first terminal device.

With reference to the third aspect and the foregoing implementations of the third aspect, in another implementation of the third aspect, the QoS attribute information includes at least one of a maximum value, a minimum value, and a value range, where the maximum value is a maximum value of a data transmission rate and/or a reliability requirement of a target service, the minimum value is a minimum value of the data transmission rate and/or the reliability requirement of the target service, the value range is a value range of the data transmission rate and/or a value range of the reliability requirement of the target service, and the target service is a service transmitted between the first terminal device and the second terminal device by using the transmission resource.

With reference to the third aspect and the foregoing implementations of the third aspect, in another implementation of the third aspect, before the sending, by the first terminal device, the QoS attribute information to a network device, the method further includes: receiving, by the first terminal device, a preset value sent by the network device, where the QoS attribute information is used to indicate a magnitude relationship between the data transmission rate and/or the reliability requirement of the first terminal device and the preset value, and the magnitude relationship is one of the following relationships: the data transmission rate and/or the reliability requirement of the first terminal device is greater than the preset value, the data transmission rate and/or the reliability requirement of the first terminal device is less than the preset value, the data transmission rate and/or the reliability requirement of the first terminal device is greater than or equal to the preset value, and the data transmission rate and/or the reliability requirement of the first terminal device is less than or equal to the preset value.

With reference to the third aspect and the foregoing implementations of the third aspect, in another implementation of the third aspect, before the sending, by the first terminal device, the QoS attribute information to a network device, the method further includes: receiving, by the first terminal device, a preset value sent by the network device, where the QoS attribute information is used to indicate a magnitude relationship between a data transmission rate and/or a reliability requirement of a target service and the preset value; the magnitude relationship is one of the following relationships: the data transmission rate and/or the reliability requirement of the target service is greater than the preset value, the data transmission rate and/or the reliability requirement of the target service is less than the preset value, the data transmission rate and/or the reliability requirement of the target service is greater than or equal to the preset value, and the data transmission rate and/or the reliability requirement of the target service is less than or equal to the preset value; and the target service is a service transmitted between the first terminal device and the second terminal device by using the transmission resource.

It should be understood that, the reliability requirement in this implementation of this application may be specifically a packet loss rate.

According to a fourth aspect, a network device is provided. The network device is configured to perform the method according to the first aspect or any possible implementation of the first aspect. Specifically, the network device includes a unit configured to perform the method according to the first aspect or any possible implementation of the first aspect.

According to a fifth aspect, a core-network network element is provided. The core-network network element is configured to perform the method according to the second aspect or any possible implementation of the second aspect. Specifically, the core-network network element includes a unit configured to perform the method according to the second aspect or any possible implementation of the second aspect.

According to a sixth aspect, a terminal device is provided. The terminal device is configured to perform the method according to the third aspect or any possible implementation of the third aspect. Specifically, the terminal device includes a unit configured to perform the method according to the third aspect or any possible implementation of the third aspect.

According to a seventh aspect, a network device is provided. The network device includes a memory and a processor. The memory is configured to store an instruction, and the processor is configured to execute the instruction stored in the memory. When the processor executes the instruction stored in the memory, the execution enables the processor to perform the method according to the first aspect or any possible implementation of the first aspect.

According to an eighth aspect, a core-network network element is provided. The core-network network element includes a memory and a processor. The memory is configured to store an instruction, and the processor is configured to execute the instruction stored in the memory. When the processor executes the instruction stored in the memory, the execution enables the processor to perform the method according to the second aspect or any possible implementation of the second aspect.

According to a ninth aspect, a terminal device is provided. The terminal device includes a memory and a processor. The memory is configured to store an instruction, and the processor is configured to execute the instruction stored in the memory. When the processor executes the instruction stored in the memory, the execution enables the processor to perform the method according to the third aspect or any possible implementation of the third aspect.

According to a tenth aspect, a computer-readable medium is provided. The computer-readable medium is configured to store a computer program. The computer program includes an instruction used to perform the method according to the first aspect or any possible implementation of the first aspect.

According to an eleventh aspect, a computer-readable medium is provided. The computer-readable medium is configured to store a computer program. The computer program includes an instruction used to perform the method according to the second aspect or any possible implementation of the second aspect.

According to a twelfth aspect, a computer-readable medium is provided. The computer-readable medium is configured to store a computer program. The computer program includes an instruction used to perform the method according to the third aspect or any possible implementation of the third aspect.

According to a thirteenth aspect, a computer program product including an instruction is provided. When a computer runs the instruction in the computer program product, the computer performs the resource allocation method according to the first aspect or any possible implementation of the first aspect. Specifically, the computer program product may be run on the network device according to the fourth aspect.

According to a fourteenth aspect, a computer program product including an instruction is provided. When a computer runs the instruction in the computer program product, the computer performs the resource allocation method according to the second aspect or any possible implementation of the second aspect. Specifically, the computer program product may be run on the core-network network element according to the fifth aspect.

According to a fifteenth aspect, a computer program product including an instruction is provided. When a computer runs the instruction in the computer program product, the computer performs the resource allocation method according to the third aspect or any possible implementation of the third aspect. Specifically, the computer program product may be run on the terminal device according to the sixth aspect.

DETAILED DESCRIPTION

The following describes technical solutions of implementations of this application with reference to the accompanying drawings.

The technical solutions of the implementations of this application may be applied to various communications systems, such as a Global System for Mobile Communications (Global System for Mobile communications, GSM) system, a Code Division Multiple Access (code division multiple access, CDMA) system, a Wideband Code Division Multiple Access (wideband code division multiple access, WCDMA) system, a general packet radio service (general packet radio service, GPRS) system, an LTE system, an LTE frequency division duplex (frequency division duplex, FDD)

system, an LTE time division duplex (Time Division Duplex, TDD) system, a Universal Mobile Telecommunications System (universal mobile telecommunication system, UMTS), a Worldwide Interoperability for Microwave Access (worldwide interoperability for microwave access, WiMAX) communications system, a future 5th generation (5th generation, 5G) system, or a new radio (new radio, NR) system.

In the implementations of this application, a terminal device may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a Session Initiation Protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, an in-vehicle device, a wearable device, a terminal device in a future 5G network, a terminal device in a future evolved public land mobile network (public land mobile network, PLMN), or the like. This is not limited in the implementations of this application.

In the implementations of this application, a network device may be a device configured to communicate with the terminal device. The network device may be a base transceiver station (base transceiver station, BTS) in a GSM system or in CDMA, a NodeB (NodeB, NB) in a WCDMA system, an evolved NodeB (evolvedNodeB, eNB or eNodeB) in an LTE system, or a wireless controller in a cloud radio access network (cloud radio access network, CRAN) scenario. Alternatively, the network device may be a relay station, an access point, an in-vehicle device, a wearable device, a network device in a future 5G network, a network device in a future evolved PLMN network. This is not limited in the implementations of this application.

Figure 1:
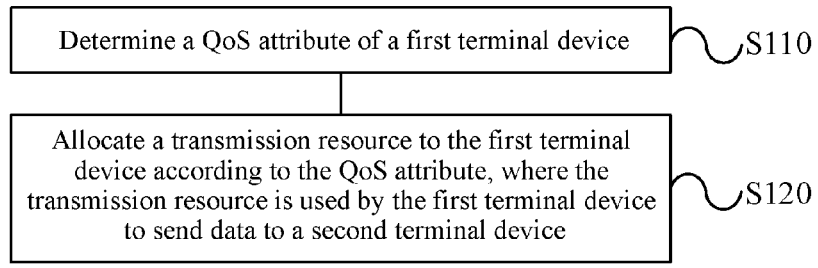
FIG. 1 is a schematic flowchart of a resource allocation method according to an implementation of this application.

FIG. 1 is a schematic flowchart of a resource allocation method 100 according to an implementation of this application. The method 100 may be performed by a network device. As shown in FIG. 1, the method 100 includes the following steps: S110. Determine a QoS attribute of a first terminal device. S120. Allocate a transmission resource to the first terminal device according to the QoS attribute, where the transmission resource is used by the first terminal device to send data to a second terminal device.

In this implementation of this application, the determining, by the network device, a QoS attribute of a first terminal device may include: receiving, by the network device, QoS attribute information sent by the first terminal device or a core-network network element; and indicating the QoS attribute of the first terminal device by using the QoS attribute information.

It should be understood that, the QoS attribute of the first terminal device may include a data transmission rate and/or a reliability requirement of the first terminal device, or may further include another parameter representing the QoS attribute of the first terminal device. This is not limited in this implementation of this application.

Specifically, the QoS attribute of the first terminal device may include a data transmission rate and/or a reliability requirement of a target service, or may further include another parameter representing a QoS attribute of the target service. The target service is a service between the first terminal device and the second terminal device. The first terminal device may transmit the target service with the second terminal device by using the transmission resource configured by the network device.

Correspondingly, the QoS attribute information may include information related to the data transmission rate of the first terminal device or the target service between the first terminal device and the second terminal device, and/or may include information related to the reliability requirement, or may further include information representing another QoS attribute. For ease of description, that the QoS attribute information includes the information related to the data transmission rate and/or the reliability requirement is used as an example for description below.

Optionally, in an implementation, the QoS attribute information may include a specific value representing the data transmission rate and/or the reliability requirement. For example, the QoS attribute information may include a specific value representing the data transmission rate. For example, any three data transmission rates may be randomly defined as X/Y/Z (Mbit/s) respectively. The QoS attribute information includes any one of the values of the three data transmission rates.

For another example, the QoS attribute information may alternatively include a specific value representing the reliability requirement. For example, the reliability requirement may be represented by using a packet loss rate, and any three packet loss rates (error rates) may be randomly defined as $10^\wedge\text{-}A/10^\wedge\text{-}B/10^\wedge\text{-}C$ respectively. The QoS attribute information may include any one of the three values.

Optionally, in an implementation, the QoS attribute information may alternatively include a maximum value and/or a minimum value of the data transmission rate and/or the reliability requirement of the first terminal device or the target service transmitted between the first terminal device and the second terminal device. Specifically, the QoS attribute information may include a maximum value, and the maximum value is a maximum value of the data transmission rate and/or the reliability requirement. That is, the network device may determine, according to the QoS attribute information, that the data transmission rate and/or the reliability requirement of the first terminal device or the target service in the corresponding QoS attribute does not exceed the maximum value.

Alternatively, the QoS attribute information may include a minimum value, and the minimum value is a minimum value of the data transmission rate and/or the reliability requirement. That is, the network device may determine, according to the QoS attribute information, that the data transmission rate and/or the reliability requirement of the first terminal device or the target service in the corresponding QoS attribute is not less than the minimum value.

Alternatively, the QoS attribute information may include a value range, and the value range corresponds to a maximum value and a minimum value. In other words, the QoS attribute information may include a range. The data transmission rate and/or the reliability requirement of the first terminal device or the target service does not exceed an upper limit of the value range, and the data transmission rate and/or the reliability requirement of the first terminal device or the target service is not less than a lower limit of the value range. That is, the network device may determine, according to the QoS attribute information, that a range of the data transmission rate and/or the reliability requirement of the first terminal device or the target service in the corresponding QoS attribute falls within the value range.

Optionally, in an implementation, before the receiving, by the network device, QoS attribute information sent by the first terminal device or a core-network network element, the method 100 further includes: sending, by the network device, a preset value to the first terminal device or the core-network network element, so that the first terminal device or the core-network network element receiving the preset value sends the QoS attribute information according to the preset value.

The QoS attribute information may include a magnitude relationship between the data transmission rate and/or the reliability requirement of the target service or the first terminal device and the preset value, and the magnitude relationship may be any one of the following four relationships: the data transmission rate and/or the reliability requirement of the target service or the first terminal device is greater than the preset value, the data transmission rate and/or the reliability requirement of the target service or the first terminal device is less than the preset value, the data transmission rate and/or the reliability requirement of the target service or the first terminal device is greater than or equal to the preset value, and the data transmission rate and/or the reliability requirement of the target service or the first terminal device is less than or equal to the preset value.

Optionally, in an implementation, the QoS attribute may alternatively be indicated by using an index. Specifically, a mapping relationship between a plurality of QoS attributes and different indexes may be established. For example, a mapping relationship between different data transmission rates and reliability requirements and different indexes is established. In this case, the QoS attribute information may include a target index, and the network device determines, according to the mapping relationship, that a QoS attribute corresponding to the target index is the QoS attribute of the first terminal device.

For example, any three data transmission rates are defined as X/Y/Z (Mbit/s) respectively. Likewise, the reliability requirement may be quantized by using a packet loss rate, and three packet loss rates are defined as $10^{\wedge}$-A/$10^{\wedge}$-B/$10^{\wedge}$-C respectively. In this case, there are a total of 3*3=9 combinations for the three data transmission rates and the three packet loss rates, and an index may be defined for each of the nine combinations, to establish a mapping relationship between the nine combinations and the nine different indexes. The network device determines that the QoS attribute information includes the target index, where the target index may be any one of the nine indexes. In this case, a combination that is of a data transmission rate and a packet loss rate and that corresponds to the target index is determined as the QoS attribute of the first terminal device.

For another example, for the nine combinations of the three data transmission rates and the three packet loss rates, alternatively, after some of the nine combinations are excluded, an index is defined for each of remaining combinations, to establish a mapping relationship between the remaining combinations and the different indexes. This is not limited in this implementation of this application.

In this implementation of this application, the network device determines the QoS attribute of the first terminal device, and allocates the transmission resource to the first terminal device according to the QoS attribute, where the transmission resource includes a carrier resource, and one or more component carriers may be allocated to the first terminal device, so that the first terminal device can use the transmission resource to send data to the second terminal device. The second terminal device may be another terminal device than the first terminal device. The first terminal device may use the transmission resource to send data to a plurality of terminal devices, and the second terminal device may be any one of the plurality of terminal devices.

Therefore, according to the resource allocation method in this implementation of this application, the network device can determine a QoS attribute of a terminal device, and allocate a transmission resource, for example, a carrier resource, to the terminal device according to the QoS attribute, so that the terminal device uses the transmission resource to send data to another terminal device, thereby improving resource utilization.

Figure 2:
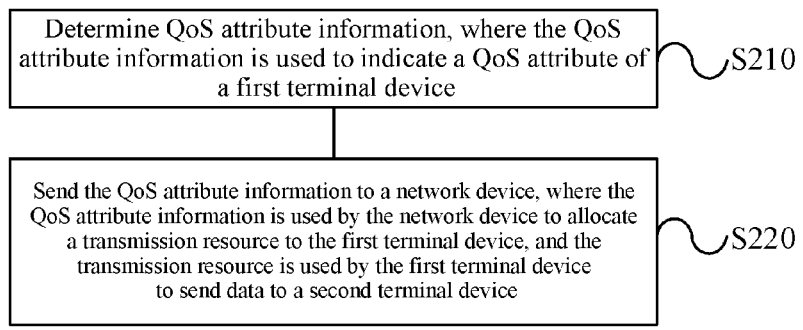
FIG. 2 is another schematic flowchart of a resource allocation method according to an implementation of this application.

FIG. 2 is a schematic flowchart of a resource allocation method 200 according to an implementation of this application. The method 200 may be performed by a communications device. Specifically, for example, the communications device may be a core-network network element, for example, a V2X function (function) network element, or the communications device may be a terminal device. As shown in FIG. 2, the method 200 includes the following steps:

S210. Determine QoS attribute information, where the QoS attribute information is used to indicate a QoS attribute of a first terminal device. S220. Send the QoS attribute information to a network device, where the QoS attribute information is used by the network device to allocate a transmission resource to the first terminal device, and the transmission resource is used by the first terminal device to send data to a second terminal device.

Optionally, the QoS attribute includes a data transmission rate and/or a reliability requirement of the first terminal device.

Optionally, the QoS attribute information includes the data transmission rate and/or a packet loss rate of the first terminal device.

Optionally, the QoS attribute information includes a target index, and the target index corresponds to the QoS attribute of the first terminal device.

Optionally, the method is performed by the core-network network element. The method 200 further includes: sending a to-be-processed service to the first terminal device, so that the first terminal device uses the transmission resource to send the to-be-processed service to the second terminal device.

Optionally, the method is performed by the first terminal device. The method 200 further includes: receiving the transmission resource sent by the network device, and using the transmission resource to send data to the second terminal device.

Optionally, the QoS attribute information includes at least one of a maximum value, a minimum value, and a value range, where the maximum value is a maximum value of the data transmission rate and/or the reliability requirement of the first terminal device, the minimum value is a minimum value of the data transmission rate and/or the reliability requirement of the first terminal device, and the value range is a value range of the data transmission rate and/or a value range of the reliability requirement of the first terminal device.

Optionally, the QoS attribute information includes at least one of a maximum value, a minimum value, and a value range, where the maximum value is a maximum value of a data transmission rate and/or a reliability requirement of a target service, the minimum value is a minimum value of the data transmission rate and/or the reliability requirement of the target service, the value range is a value range of the data transmission rate and/or a value range of the reliability requirement of the target service, and the target service is a service transmitted between the first terminal device and the second terminal device by using the transmission resource.

Optionally, before the sending the QoS attribute information to a network device, the method further includes: receiving a preset value sent by the network device. The QoS attribute information is used to indicate a magnitude relationship between the data transmission rate and/or the reliability requirement of the first terminal device and the preset value, and the magnitude relationship is one of the following relationships: the data transmission rate and/or the reliability requirement of the first terminal device is greater than the preset value, the data transmission rate and/or the reliability requirement of the first terminal device is less than the preset value, the data transmission rate and/or the reliability requirement of the first terminal device is greater than or equal to the preset value, and the data transmission rate and/or the reliability requirement of the first terminal device is less than or equal to the preset value.

Optionally, before the sending the QoS attribute information to a network device, the method further includes: receiving a preset value sent by the network device. The QoS attribute information is used to indicate a magnitude relationship between a data transmission rate and/or a reliability requirement of a target service and the preset value. The magnitude relationship is one of the following relationships: the data transmission rate and/or the reliability requirement of the target service is greater than the preset value, the data transmission rate and/or the reliability requirement of the target service is less than the preset value, the data transmission rate and/or the reliability requirement of the target service is greater than or equal to the preset value, and the data transmission rate and/or the reliability requirement of the target service is less than or equal to the preset value. The target service is a service transmitted between the first terminal device and the second terminal device by using the transmission resource.

It should be understood that, the reliability requirement in this implementation of this application may be specifically a packet loss rate.

It should be understood that, the core-network network element in the method 200 may correspond to the core-network network element in the method 100, the first terminal device in the method 200 may correspond to the first terminal device in the method 100, and the network device in the method 200 may correspond to the network device in the method 100. Details are not described herein again.

Therefore, according to the resource allocation method in this implementation of this application, QoS attribute information including a QoS attribute of a terminal device is sent to the network device. In this way, the network device can determine the QoS attribute of the terminal device, and allocate a transmission resource, for example, a carrier resource, to the terminal device according to the QoS attribute, so that the terminal device uses the transmission resource to send data to another terminal device, thereby improving resource utilization.

It should be understood that sequence numbers of the foregoing processes do not mean execution sequences in various implementations of this application. The execution sequences of the processes should be determined according to functions and internal logic of the processes, and should not be construed as any limitation on the implementation processes of the implementations of this application.

The foregoing describes the resource allocation method according to the implementations of this application in detail with reference to FIG. 1 and FIG. 2. The following describes a network device and a communications device according to the implementations of this application in detail with reference to FIG. 3 to FIG. 6.

Figure 3:
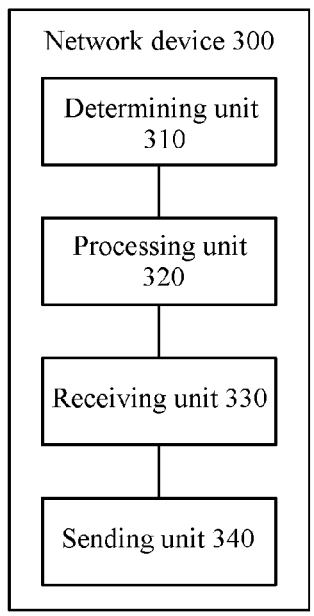
FIG. 3 is a schematic block diagram of a network device according to an implementation of this application.

As shown in FIG. 3, a network device 300 according to an implementation of this application includes a determining unit 310 and a processing unit 320, and optionally, may further include a receiving unit 330 and a sending unit 340.

Specifically, the determining unit 310 is configured to determine a QoS attribute of a first terminal device. The processing unit 320 is configured to allocate a transmission resource to the first terminal device according to the QoS attribute, where the transmission resource is used by the first terminal device to send data to a second terminal device.

Optionally, the QoS attribute includes a data transmission rate and/or a reliability requirement of the first terminal device.

Optionally, the receiving unit 330 is configured to receive QoS attribute information sent by the first terminal device or a core-network network element. The determining unit 310 is specifically configured to determine the QoS attribute of the first terminal device according to the QoS attribute information.

Optionally, the QoS attribute information includes the data transmission rate and/or a packet loss rate of the first terminal device.

Optionally, the QoS attribute information includes a target index. The determining unit 310 is specifically configured to determine, according to a correspondence between different QoS attributes and different indexes, that a QoS attribute corresponding to the target index is the QoS attribute of the first terminal device.

Optionally, the correspondence between different QoS attributes and different indexes is a correspondence between different data transmission rates and reliability requirements and different indexes. The determining unit 310 is specifically configured to determine, according to the correspondence between different data transmission rates and reliability requirements and different indexes, that a data transmission rate and a reliability requirement corresponding to the target index is the QoS attribute of the first terminal device.

Optionally, the QoS attribute information includes at least one of a maximum value, a minimum value, and a value range, where the maximum value is a maximum value of the data transmission rate and/or the reliability requirement of the first terminal device, the minimum value is a minimum value of the data transmission rate and/or the reliability requirement of the first terminal device, and the value range is a value range of the data transmission rate and/or a value range of the reliability requirement of the first terminal device.

Optionally, the QoS attribute information includes at least one of a maximum value, a minimum value, and a value range, where the maximum value is a maximum value of a data transmission rate and/or a reliability requirement of a target service, the minimum value is a minimum value of the data transmission rate and/or the reliability requirement of the target service, the value range is a value range of the data transmission rate and/or a value range of the reliability requirement of the target service, and the target service is a service transmitted between the first terminal device and the second terminal device by using the transmission resource.

Optionally, the sending unit 340 is configured to: before the receiving unit 330 receives the QoS attribute information sent by the first terminal device or the core-network network element, send a preset value to the first terminal device or the core-network network element. The QoS attribute information is used to indicate a magnitude relationship between the data transmission rate and/or the reliability requirement of the first terminal device and the preset value, and the magnitude relationship is one of the following relationships: the data transmission rate and/or the reliability requirement of the first terminal device is greater than the preset value, the data transmission rate and/or the reliability requirement of the first terminal device is less than the preset value, the data transmission rate and/or the reliability requirement of the first terminal device is greater than or equal to the preset value, and the data transmission rate and/or the reliability requirement of the first terminal device is less than or equal to the preset value.

Optionally, the sending unit 340 is configured to: before the receiving unit 330 receives the QoS attribute information sent by the first terminal device or the core-network network element, send a preset value to the first terminal device or the core-network network element. The QoS attribute information is used to indicate a magnitude relationship between a data transmission rate and/or a reliability requirement of a target service and the preset value. The magnitude relationship is one of the following relationships: the data transmission rate and/or the reliability requirement of the target service is greater than the preset value, the data transmission rate and/or the reliability requirement of the target service is less than the preset value, the data transmission rate and/or the reliability requirement of the target service is greater than or equal to the preset value, and the data transmission rate and/or the reliability requirement of the target service is less than or equal to the preset value. The target service is a service transmitted between the first terminal device and the second terminal device by using the transmission resource.

It should be understood that, the network device 300 according to this implementation of this application may correspondingly perform the method 100 in the implementations of this application, and the foregoing and other operations and/or functions of the units of the network device 300 are respectively intended to implement corresponding procedures of the network device in the methods in FIG. 1 and FIG. 2. For simplicity, details are not described herein again.

Therefore, the network device according to this implementation of this application can determine a QoS attribute of a terminal device, and allocate a transmission resource, for example, a carrier resource, to the terminal device according to the QoS attribute, so that the terminal device uses the transmission resource to send data to another terminal device, thereby improving resource utilization.

Figure 4:
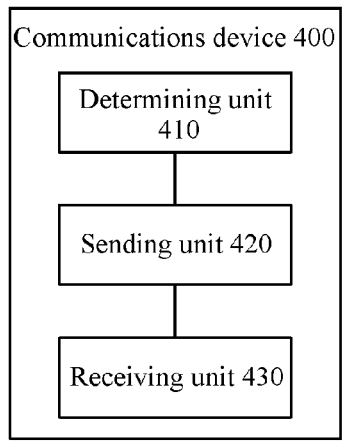
FIG. 4 is a schematic block diagram of a communications device according to an implementation of this application.

As shown in FIG. 4, a communications device 400 according to an implementation of this application includes a determining unit 410 and a sending unit 420, and optionally, may further include a receiving unit 430.

Specifically, the determining unit 410 is configured to determine QoS attribute information, where the QoS attribute information is used to indicate a QoS attribute of a first terminal device. The sending unit 420 is configured to send the QoS attribute information to a network device, where the QoS attribute information is used by the network device to allocate a transmission resource to the first terminal device, and the transmission resource is used by the first terminal device to send data to a second terminal device.

Optionally, the QoS attribute includes a data transmission rate and/or a reliability requirement of the first terminal device.

Optionally, the QoS attribute information includes the data transmission rate and/or a packet loss rate of the first terminal device.

Optionally, the QoS attribute information includes a target index, and the target index corresponds to the QoS attribute of the first terminal device.

Optionally, the QoS attribute information includes at least one of a maximum value, a minimum value, and a value range, where the maximum value is a maximum value of the data transmission rate and/or the reliability requirement of the first terminal device, the minimum value is a minimum value of the data transmission rate and/or the reliability requirement of the first terminal device, and the value range is a value range of the data transmission rate and/or a value range of the reliability requirement of the first terminal device.

Optionally, the QoS attribute information includes at least one of a maximum value, a minimum value, and a value range, where the maximum value is a maximum value of a data transmission rate and/or a reliability requirement of a target service, the minimum value is a minimum value of the data transmission rate and/or the reliability requirement of the target service, the value range is a value range of the data transmission rate and/or a value range of the reliability requirement of the target service, and the target service is a service transmitted between the first terminal device and the second terminal device by using the transmission resource.

Optionally, the receiving unit 430 is configured to: before the sending unit 420 sends the QoS attribute information to the network device, receive a preset value sent by the network device. The QoS attribute information is used to indicate a magnitude relationship between the data transmission rate and/or the reliability requirement of the first terminal device and the preset value, and the magnitude relationship is one of the following relationships: the data transmission rate and/or the reliability requirement of the first terminal device is greater than the preset value, the data transmission rate and/or the reliability requirement of the first terminal device is less than the preset value, the data transmission rate and/or the reliability requirement of the first terminal device is greater than or equal to the preset value, and the data transmission rate and/or the reliability requirement of the first terminal device is less than or equal to the preset value.

Optionally, the receiving unit 430 is configured to: before the sending unit 420 sends the QoS attribute information to the network device, receive a preset value sent by the network device. The QoS attribute information is used to indicate a magnitude relationship between a data transmission rate and/or a reliability requirement of a target service and the preset value. The magnitude relationship is one of the following relationships: the data transmission rate and/or the reliability requirement of the target service is greater than the preset value, the data transmission rate and/or the reliability requirement of the target service is less than the preset value, the data transmission rate and/or the reliability requirement of the target service is greater than or equal to the preset value, and the data transmission rate and/or the reliability requirement of the target service is less than or equal to the preset value. The target service is a service transmitted between the first terminal device and the second terminal device by using the transmission resource.

Optionally, the communications device 400 is a core-network network element or the first terminal device.

It should be understood that, the communications device 400 according to this implementation of this application may correspondingly perform the method 200 in the implementations of this application, and the foregoing and other operations and/or functions of the units of the communications device 400 are respectively intended to implement corresponding procedures of the core-network network element or the first terminal device in the methods in FIG. 1 and FIG. 2. For simplicity, details are not described herein again.

Therefore, the communications device according to this implementation of this application sends QoS attribute information including a QoS attribute of a terminal device to the network device. In this way, the network device can determine the QoS attribute of the terminal device, and allocate a transmission resource, for example, a carrier resource, to the terminal device according to the QoS attribute, so that the terminal device uses the transmission resource to send data to another terminal device, thereby improving resource utilization.

Figure 5:
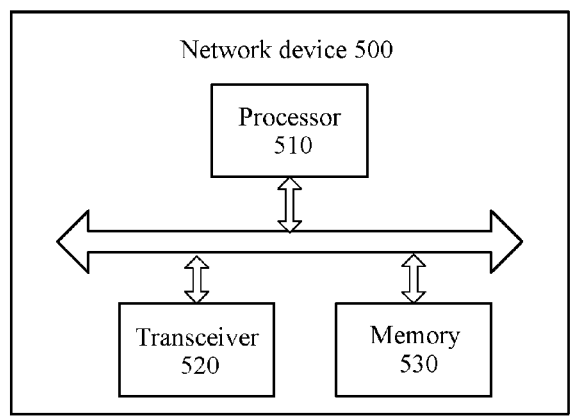
FIG. 5 is another schematic block diagram of a network device according to an implementation of this application.

FIG. 5 is a schematic block diagram of a network device 500 according to an implementation of this application. As shown in FIG. 5, the network device 500 includes a processor 510 and a transceiver 520. The processor 510 is connected to the transceiver 520. Optionally, the network device 500 further includes a memory 530. The memory 530 is connected to the processor 510. The processor 510, the memory 530, and the transceiver 520 communicate with each other through an internal connection path, to transfer and/or control a data signal. The memory 530 may be configured to store an instruction. The processor 510 is configured to execute the instruction stored in the memory 530, to control the transceiver 520 to send information or a signal. The processor 510 is configured to: determine a QoS attribute of a first terminal device; and allocate a transmission resource to the first terminal device according to the QoS attribute, where the transmission resource is used by the first terminal device to send data to a second terminal device.

Optionally, in an implementation, the QoS attribute includes a data transmission rate and/or a reliability requirement of the first terminal device.

Optionally, in an implementation, the transceiver 520 is configured to receive QoS attribute information sent by the first terminal device or a core-network network element. The processor 510 is configured to determine the QoS attribute of the first terminal device according to the QoS attribute information.

Optionally, in an implementation, the QoS attribute information includes the data transmission rate and/or a packet loss rate of the first terminal device.

Optionally, in an implementation, the QoS attribute information includes a target index. The processor 510 is configured to determine, according to a correspondence between different QoS attributes and different indexes, that a QoS attribute corresponding to the target index is the QoS attribute of the first terminal device.

Optionally, in an implementation, the correspondence between different QoS attributes and different indexes is a correspondence between different data transmission rates and reliability requirements and different indexes. The processor 510 is configured to determine, according to the correspondence between different data transmission rates and reliability requirements and different indexes, that a data transmission rate and a reliability requirement corresponding to the target index is the QoS attribute of the first terminal device.

Optionally, in an implementation, the QoS attribute information includes at least one of a maximum value, a minimum value, and a value range, where the maximum value is a maximum value of the data transmission rate and/or the reliability requirement of the first terminal device, the minimum value is a minimum value of the data transmission rate and/or the reliability requirement of the first terminal device, and the value range is a value range of the data transmission rate and/or a value range of the reliability requirement of the first terminal device.

Optionally, in an implementation, the QoS attribute information includes at least one of a maximum value, a minimum value, and a value range, where the maximum value is a maximum value of a data transmission rate and/or a reliability requirement of a target service, the minimum value is a minimum value of the data transmission rate and/or the reliability requirement of the target service, the value range is a value range of the data transmission rate and/or a value range of the reliability requirement of the target service, and the target service is a service transmitted between the first terminal device and the second terminal device by using the transmission resource.

Optionally, in an implementation, the transceiver 520 is configured to: before receiving the QoS attribute information sent by the first terminal device or the core-network network element, send a preset value to the first terminal device or the core-network network element. The QoS attribute information is used to indicate a magnitude relationship between the data transmission rate and/or the reliability requirement of the first terminal device and the preset value, and the magnitude relationship is one of the following relationships: the data transmission rate and/or the reliability requirement of the first terminal device is greater than the preset value, the data transmission rate and/or the reliability requirement of the first terminal device is less than the preset value, the data transmission rate and/or the reliability requirement of the first terminal device is greater than or equal to the preset value, and the data transmission rate and/or the reliability requirement of the first terminal device is less than or equal to the preset value.

Optionally, in an implementation, the transceiver 520 is configured to: before receiving the QoS attribute information sent by the first terminal device or the core-network network element, send a preset value to the first terminal device or the core-network network element. The QoS attribute information is used to indicate a magnitude relationship between a data transmission rate and/or a reliability requirement of a target service and the preset value. The magnitude relationship is one of the following relationships: the data transmission rate and/or the reliability requirement of the target service is greater than the preset value, the data transmission rate and/or the reliability requirement of the target service is less than the preset value, the data transmission rate and/or the reliability requirement of the target service is greater than or equal to the preset value, and the data transmission rate and/or the reliability requirement of the target service is less than or equal to the preset value. The target service is a service transmitted between the first terminal device and the second terminal device by using the transmission resource.

It should be understood that, the network device 500 according to this implementation of this application may correspond to the network device 300 in the implementations of this application, and may correspond to a corresponding body in the method 100 according to the implementations of this application, and the foregoing and other operations and/or functions of the units of the network device 500 are respectively intended to implement corresponding procedures of the network device in the methods in FIG. 1 and FIG. 2. For simplicity, details are not described herein again.

Therefore, the network device according to this implementation of this application can determine a QoS attribute of a terminal device, and allocate a transmission resource, for example, a carrier resource, to the terminal device according to the QoS attribute, so that the terminal device uses the transmission resource to send data to another terminal device, thereby improving resource utilization.

Figure 6:
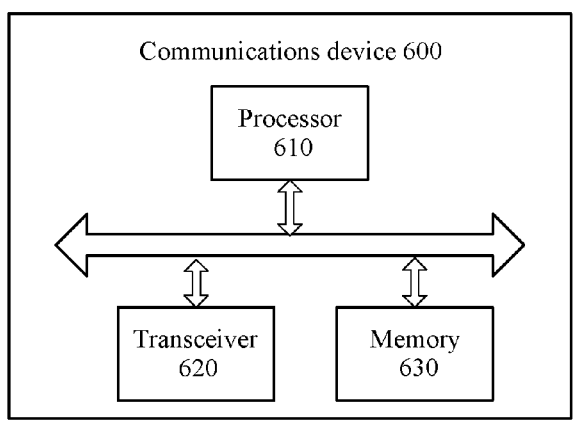
FIG. 6 is another schematic block diagram of a communications device according to an implementation of this application.

FIG. 6 is a schematic block diagram of a communications device 600 according to an implementation of this application. As shown in FIG. 6, the communications device 600 includes a processor 610 and a transceiver 620. The processor 610 is connected to the transceiver 620. Optionally, the communications device 600 further includes a memory 630. The memory 630 is connected to the processor 610. The processor 610, the memory 630, and the transceiver 620 communicate with each other through an internal connection path, to transfer and/or control a data signal. The memory 630 may be configured to store an instruction. The processor 610 is configured to execute the instruction stored in the memory 630, to control the transceiver 620 to send information or a signal. The processor 610 is configured to: determine QoS attribute information, where the QoS attribute information is used to indicate a QoS attribute of a first terminal device. The transceiver 620 is configured to send the QoS attribute information to a network device, where the QoS attribute information is used by the network device to allocate a transmission resource to the first terminal device, and the transmission resource is used by the first terminal device to send data to a second terminal device.

Optionally, in an implementation, the QoS attribute includes a data transmission rate and/or a reliability requirement of the first terminal device.

Optionally, in an implementation, the QoS attribute information includes the data transmission rate and/or a packet loss rate of the first terminal device.

Optionally, in an implementation, the QoS attribute information includes a target index, and the target index corresponds to the QoS attribute of the first terminal device.

Optionally, in an implementation, the QoS attribute information includes at least one of a maximum value, a minimum value, and a value range, where the maximum value is a maximum value of the data transmission rate and/or the reliability requirement of the first terminal device, the minimum value is a minimum value of the data transmission rate and/or the reliability requirement of the first terminal device, and the value range is a value range of the data transmission rate and/or a value range of the reliability requirement of the first terminal device.

Optionally, in an implementation, the QoS attribute information includes at least one of a maximum value, a minimum value, and a value range, where the maximum value is a maximum value of a data transmission rate and/or a reliability requirement of a target service, the minimum value is a minimum value of the data transmission rate and/or the reliability requirement of the target service, the value range is a value range of the data transmission rate and/or a value range of the reliability requirement of the target service, and the target service is a service transmitted between the first terminal device and the second terminal device by using the transmission resource.

Optionally, in an implementation, the transceiver 620 is configured to: before sending the QoS attribute information to the network device, receive a preset value sent by the network device. The QoS attribute information is used to indicate a magnitude relationship between the data transmission rate and/or the reliability requirement of the first terminal device and the preset value, and the magnitude relationship is one of the following relationships: the data transmission rate and/or the reliability requirement of the first terminal device is greater than the preset value, the data transmission rate and/or the reliability requirement of the first terminal device is less than the preset value, the data transmission rate and/or the reliability requirement of the first terminal device is greater than or equal to the preset value, and the data transmission rate and/or the reliability requirement of the first terminal device is less than or equal to the preset value.

Optionally, in an implementation, the transceiver 620 is configured to: before sending the QoS attribute information to the network device, receive a preset value sent by the network device. The QoS attribute information is used to indicate a magnitude relationship between a data transmission rate and/or a reliability requirement of a target service and the preset value. The magnitude relationship is one of the following relationships: the data transmission rate and/or the reliability requirement of the target service is greater than the preset value, the data transmission rate and/or the reliability requirement of the target service is less than the preset value, the data transmission rate and/or the reliability requirement of the target service is greater than or equal to the preset value, and the data transmission rate and/or the reliability requirement of the target service is less than or equal to the preset value. The target service is a service transmitted between the first terminal device and the second terminal device by using the transmission resource.

Optionally, in an implementation, the communications device 600 is a core-network network element or the first terminal device.

It should be understood that, the communications device 600 according to this implementation of this application may correspond to the communications device 400 in the implementations of this application, and may correspond to a corresponding body in the method 200 according to the implementations of this application, and the foregoing and other operations and/or functions of the units of the communications device 600 are respectively intended to implement corresponding procedures of the first terminal device or the core-network network element in the methods in FIG. 1 and FIG. 2. For simplicity, details are not described herein again.

Therefore, the communications device according to this implementation of this application sends QoS attribute information including a QoS attribute of a terminal device to the network device. In this way, the network device can determine the QoS attribute of the terminal device, and allocate a transmission resource, for example, a carrier resource, to the terminal device according to the QoS attribute, so that the terminal device uses the transmission resource to send data to another terminal device, thereby improving resource utilization.

It should be noted that the foregoing method implementations of this application may be applied to a processor, or implemented by a processor. The processor may be an integrated circuit chip and has a signal processing capability. In an implementation process, steps in the foregoing method implementations may be completed by using a hardware integrated logical circuit in the processor, or an instruction in a form of software. The processor may be a general-purpose processor, a digital signal processor (digital signal processor, DSP), an application specific integrated circuit (application specific integrated circuit, ASIC), a field programmable gate array (field programmable gate array, FPGA), or another programmable logic device, a discrete gate or a transistor logic device, or a discrete hardware component. The processor can implement or execute methods, steps, and logical block diagrams disclosed in the implementations of this application. The general-purpose processor may be a microprocessor, or the processor may be any conventional processor or the like. The steps in the methods disclosed in the implementations of this application may be directly completed by a hardware decoding processor, or may be completed by combining hardware and software modules in a decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and performs the steps of the foregoing methods in combination with hardware of the processor.

It may be understood that the memory in the implementations of this application may be a volatile memory or a nonvolatile memory, or may include a volatile memory and a nonvolatile memory. The non-volatile memory may be a read-only memory (read-only memory, ROM), a programmable read-only memory (programmable rom, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not limitation, RAMs in many forms such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM) may be used. It should be noted that the memory in the systems and methods described in this specification includes but is not limited to those and any memory of another proper type.

It should be understood that in the implementations of this application, "B corresponding to A" indicates that B is associated with A, and B may be determined according to A. However, it should further be understood that determining B according to A does not mean that B is determined according to A only; that is, B may alternatively be determined according to A and/or other information.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the implementations disclosed in this specification, units, algorithms, and steps may be implemented by electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method implementations, and details are not described herein.

In the several implementations provided in this application, it should be understood that the disclosed system, apparatus and method may be implemented in other manners. For example, the described apparatus implementation is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the implementations.

In addition, function units in the implementations of this application may be integrated into one processing unit, or each of the units may exist alone physically, or two or more units may be integrated into one unit.

When being implemented in the form of a software function unit and sold or used as a separate product, the functions may be stored in a computer-readable storage medium. Based on such understanding, the technical solutions of this application essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to execute all or some of steps of the methods described in the implementations of this application. The storage medium includes any medium that is capable of storing program code, such as a USB flash disk, a removable hard disk, a ROM, a RAM, a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource allocation method, comprising:
   determining a quality of service (QoS) attribute information, wherein the QoS attribute information is used to indicate a QoS attribute of a first terminal device; and
   sending the QoS attribute information to a network device, wherein the QoS attribute information is used by the network device to allocate a transmission resource to the first terminal device, and the transmission resource is used by the first terminal device to send data to a second terminal device, wherein the QoS attribute information comprises a target index, and wherein the target index corresponds to the QoS attribute of the first terminal device, and the target index is used to indicate the QoS attribute of the first terminal device according to a correspondence between different QoS attributes and different indexes, wherein before sending the QoS attribute information to the network device:
receiving a preset value sent by the network device, wherein the QoS attribute information is used to indicate a magnitude relationship between at least one of the data transmission rate or the reliability requirement of the first terminal device and the preset value, and wherein the magnitude relationship is one of the following relationships: at least one of the data transmission rate or the reliability requirement of the first terminal device is greater than the preset value, at least one of the data transmission rate or the reliability requirement of the first terminal device is less than the preset value, at least one of the data transmission rate or the reliability requirement of the first terminal device is greater than or equal to the preset value, and at least one of the data transmission rate or the reliability requirement of the first terminal device is less than or equal to the preset value; or wherein before sending the QoS attribute information to the network device:
receiving a preset value sent by the network device, wherein the QoS attribute information is used to indicate a magnitude relationship between at least one of a data transmission rate or a reliability requirement of a target service and the preset value, wherein the magnitude relationship is one of the following relationships: at least one of the data transmission rate or the reliability requirement of the target service is greater than the preset value, at least one of the data transmission rate or the reliability requirement of the target service is less than the preset value, at least one of the data transmission rate or the reliability requirement of the target service is greater than or equal to the preset value, and at least one of the data transmission rate or the reliability requirement of the target service is less than or equal to the preset value, and wherein the target service is a service transmitted between the first terminal device and the second terminal device by using the transmission resource.

2. The resource allocation method according to claim 1, wherein the QoS attribute comprises at least one of a data transmission rate or a reliability requirement of the first terminal device.

3. The resource allocation method according to claim 2, wherein the QoS attribute information comprises at least one of the data transmission rate or a packet loss rate of the first terminal device.

4. The resource allocation method according to claim 2, wherein the QoS attribute information comprises at least one of a maximum value, a minimum value, and a value range, wherein
the maximum value is a maximum value of at least one of the data transmission rate or the reliability requirement of the first terminal device, the minimum value is a minimum value of at least one of the data transmission rate or the reliability requirement of the first terminal device, and the value range is a value range of at least one of the data transmission rate or a value range of the reliability requirement of the first terminal device.

5. The resource allocation method according to claim 2, wherein the QoS attribute information comprises at least one of a maximum value, a minimum value, and a value range, wherein
the maximum value is a maximum value of at least one of a data transmission rate or a reliability requirement of a target service, the minimum value is a minimum value of at least one of the data transmission rate or the reliability requirement of the target service, the value range is a value range of at least one of the data transmission rate or a value range of the reliability requirement of the target service, and the target service is a service transmitted between the first terminal device and the second terminal device by using the transmission resource.

6. The resource allocation method according to claim 1, wherein the method is performed by a core-network network element or the first terminal device.

7. A network device, comprising: a processor and a transceiver;
wherein the transceiver is configured to receive a quality of service (QoS) attribute information, wherein the QoS attribute information is used to indicate a QoS attribute of a first terminal device; and
the processor is configured to allocate a transmission resource to the first terminal device according to the QoS attribute, wherein the transmission resource is used by the first terminal device to send data to a second terminal device; and
wherein the QoS attribute information comprises a target index, and wherein the target index corresponds to the QoS attribute of the first terminal device, and the target index is used to indicate the QoS attribute of the first terminal device according to a correspondence between different QoS attributes and different indexes,
wherein the transceiver is further configured to:
before receiving unit receives the QoS attribute information sent by the first terminal device or the core-network network element, send a preset value to the first terminal device or the core-network network element,
wherein the QoS attribute information is used to indicate a magnitude relationship between the data transmission rate and/or the reliability requirement of the first terminal device and the preset value, and
wherein the magnitude relationship is one of following relationships: the data transmission rate and/or the reliability requirement of the first terminal device is greater than the preset value, the data transmission rate and/or the reliability requirement of the first terminal device is less than the preset value, the data transmission rate and/or the reliability requirement of the first terminal device is greater than or equal to the preset value, and the data transmission rate and/or the reliability requirement of the first terminal device is less than or equal to the preset value; or
before the receiving unit receives the QoS attribute information sent by the first terminal device or the core-network network element, send a preset value to the first terminal device or the core-network network element,
wherein the QoS attribute information is used to indicate a magnitude relationship between a data transmission rate and/or a reliability requirement of a target service and the preset value, wherein the magnitude relationship is one of the following relationships: the data transmission rate and/or the reliability requirement of the target service is greater than the preset value, the data transmission rate and/or the reliability requirement of the target service is less than the preset value, the data transmission rate and/or the reliability requirement of the target service is greater than or equal to the preset value, and the data transmission rate and/or the reliability requirement of the target service is less than or equal to the preset value, and wherein the target service is a service transmitted between the first terminal device and the second terminal device by using the transmission resource.

8. The network device according to claim 7, wherein the QoS attribute comprises at least one of a data transmission rate or a reliability requirement of the first terminal device.

9. A communications device, comprising: a processor and a transceiver;

wherein the processor is configured to determine a quality of service (QoS) attribute information, wherein the QoS attribute information is used to indicate a QoS attribute of a first terminal device; and the transceiver is configured to send the QoS attribute information to a network device, wherein the QoS attribute information is used by the network device to allocate a transmission resource to the first terminal device, and the transmission resource is used by the first terminal device to send data to a second terminal device, wherein the QoS attribute information comprises a target index, and wherein the target index corresponds to the QoS attribute of the first terminal device, and the target index is used to indicate the QoS attribute of the first terminal device according to a correspondence between different QoS attributes and different indexes, wherein the transceiver is further configured to:

before the sending unit sends the QoS attribute information to the network device, receive a preset value sent by the network device, wherein the QoS attribute information is used to indicate a magnitude relationship between at least one of the data transmission rate or the reliability requirement of the first terminal device and the preset value, and wherein the magnitude relationship is one of the following relationships: at least one of the data transmission rate or the reliability requirement of the first terminal device is greater than the preset value, at least one of the data transmission rate or the reliability requirement of the first terminal device is less than the preset value, at least one of the data transmission rate or the reliability requirement of the first terminal device is greater than or equal to the preset value, and at least one of the data transmission rate or the reliability requirement of the first terminal device is less than or equal to the preset value; or before the sending unit sends the QoS attribute information to the network device, receive a preset value sent by the network device, wherein the QoS attribute information is used to indicate a magnitude relationship between at least one of a data transmission rate or a reliability requirement of a target service and the preset value, wherein the magnitude relationship is one of the following relationships: at least one of the data transmission rate or the reliability requirement of the target service is greater than the preset value, at least one of the data transmission rate or the reliability requirement of the target service is less than the preset value, at least one of the data transmission rate or the reliability requirement of the target service is greater than or equal to the preset value, and at least one of the data transmission rate or the reliability requirement of the target service is less than or equal to the preset value, and wherein the target service is a service transmitted between the first terminal device and the second terminal device by using the transmission resource.

10. The communications device according to claim 9, wherein the QoS attribute comprises at least one of a data transmission rate or a reliability requirement of the first terminal device.

11. The communications device according to claim 10, wherein the QoS attribute information comprises at least one of the data transmission rate or a packet loss rate of the first terminal device.

12. The communications device according to claim 10, wherein the QoS attribute information comprises at least one of a maximum value, a minimum value, and a value range, wherein the maximum value is a maximum value of at least one of the data transmission rate or the reliability requirement of the first terminal device, the minimum value is a minimum value of at least one of the data transmission rate or the reliability requirement of the first terminal device, and the value range is a value range of at least one of the data transmission rate or a value range of the reliability requirement of the first terminal device.

13. The communications device according to claim 10, wherein the QoS attribute information comprises at least one of a maximum value, a minimum value, and a value range, wherein the maximum value is a maximum value of at least one of a data transmission rate or a reliability requirement of a target service, the minimum value is a minimum value of at least one of the data transmission rate or the reliability requirement of the target service, the value range is a value range of at least one of the data transmission rate or a value range of the reliability requirement of the target service, and the target service is a service transmitted between the first terminal device and the second terminal device by using the transmission resource.

14. The communications device according to claim 9, wherein the communications device is a core-network network element or the first terminal device.

* * * * *